(12) United States Patent
Kohlenberg et al.

(10) Patent No.: US 9,613,196 B2
(45) Date of Patent: Apr. 4, 2017

(54) PROTECTION SYSTEM INCLUDING MACHINE LEARNING SNAPSHOT EVALUATION

(71) Applicant: Intel Corporation, Santa Clara, CA (US)

(72) Inventors: Tobias M. Kohlenberg, Portland, OR (US); Igor Tatourian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/360,333

(22) PCT Filed: Dec. 19, 2013

(86) PCT No.: PCT/US2013/076489
§ 371 (c)(1),
(2) Date: May 23, 2014

(87) PCT Pub. No.: WO2015/094271
PCT Pub. Date: Jun. 25, 2015

(65) Prior Publication Data
US 2015/0178496 A1    Jun. 25, 2015

(51) Int. Cl.
*G06F 12/14*    (2006.01)
*G06F 21/31*    (2013.01)
(52) U.S. Cl.
CPC ................................. *G06F 21/316* (2013.01)
(58) Field of Classification Search
CPC ...................................................... G06F 21/60
See application file for complete search history.

(56) References Cited

U.S. PATENT DOCUMENTS

2012/0072983 A1    3/2012  McCusker et al.
2012/0110174 A1*   5/2012  Wootton ............... G06F 21/564
                                                    709/224

(Continued)

OTHER PUBLICATIONS

International Search Report and Written Opinion received for PCT Application No. PCT/US2013/076489, mailed on Sep. 26, 2014, 10 pages.

(Continued)

*Primary Examiner* — Mohammed Waliullah
(74) *Attorney, Agent, or Firm* — Grossman, Tucker, Perreault & Pfleger, PLLC

(57) ABSTRACT

This disclosure is directed to a protection system including machine learning snapshot evaluation. A device may comprise a machine learning engine (MLE) to generate snapshots of device operation. The MLE may use active or planned operations in the snapshot to learn user behavior. Once normal user behavior is established for the device, the MLE may be able to determine when snapshots include unusual behavior that may signify a threat to the device. Snapshots determined to include unusual behavior may be transmitted to a remote resource for evaluation. The remote resource may include at least a user behavior classification engine (UBCE) to classify the user behavior by characterizing it as at least one type of use. The snapshot may be analyzed by the UBCE to determine if potential threats exist in the device, and the threat analysis may be provided to the device for evaluation and/or corrective action.

15 Claims, 4 Drawing Sheets

(56) References Cited

U.S. PATENT DOCUMENTS

| | | |
|---|---|---|
| 2012/0204265 A1 | 8/2012 | Judge |
| 2013/0036472 A1 | 2/2013 | Aziz |
| 2013/0097706 A1 | 4/2013 | Titonis et al. |
| 2013/0097709 A1* | 4/2013 | Basavapatna ......... G06F 21/552 726/25 |
| 2013/0305357 A1* | 11/2013 | Ayyagari ................ H04L 63/14 726/22 |
| 2013/0305358 A1 | 11/2013 | Gathala et al. |

OTHER PUBLICATIONS

Microsoft Blog, The Fire Hose, "Network real-time inspection is latest tool to fight malware, detect suspicious activity," http://blogs.microsoft.com/firehose/2013/06/25/network-real-time-inspection-is-latest-tool-to-fight-malware-detect-suspicious-activity/, posted Jun. 25, 2013. 3 pages.

Notification Concerning Transmittal of International Preliminary Report on Patentability, and Written Opinion, issued in corresponding PCT Application No. PCT.US2013/076489, dated Jun. 30, 2016.

* cited by examiner

PROTECTION SYSTEM INCLUDING MACHINE LEARNING SNAPSHOT EVALUATION

TECHNICAL FIELD

The present disclosure relates to protection systems, and more particularly, to a threat monitoring system with a machine learning engine to evaluate snapshots of device operation.

BACKGROUND

Modern society is increasingly relying upon a multitude of electronic technology for conducting everyday interaction. For example, personal and professional communications, purchase transactions, account accessing, financial transactions, contractual agreements, etc. are being conducted using electronic communication. As a result of this increasing reliance, a plethora of personal, private and/or confidential information is being stored on electronic devices. Personal and/or business identification information, address information, account identifiers, medical data, relationship information, etc. may be stored in support of various applications or interfaces that provide functionality of conducting electronic transactions. The availability of personal, private and/or confidential information in one location may be attractive to unauthorized parties that seek to use such information for their own benefit. As a result, the implementation of protective measures in electronic devices is necessary to prevent personal, private and/or confidential information from falling into the wrong hands.

A typical protection model may include a software component installed in the device to monitor for threats. The software component may be administered by a centralized entity that provides updates to the software component and/or rules utilized to monitor for threats. While this architecture has been somewhat effective, it has been the standard for so long that many attacks (e.g., malware such as viruses or worms, attempts at unauthorized access, etc.) have been designed specifically to overcome this type of protection system. For example, the appearance of malware may be altered to circumvent monitoring rules, or malware may be inserted into low-level device operations (e.g., operating at a higher privilege level than the protection component) to circumvent detection. If an attack cannot be detected by the local protective measures in a device, then the device may be rendered defenseless to the attack.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
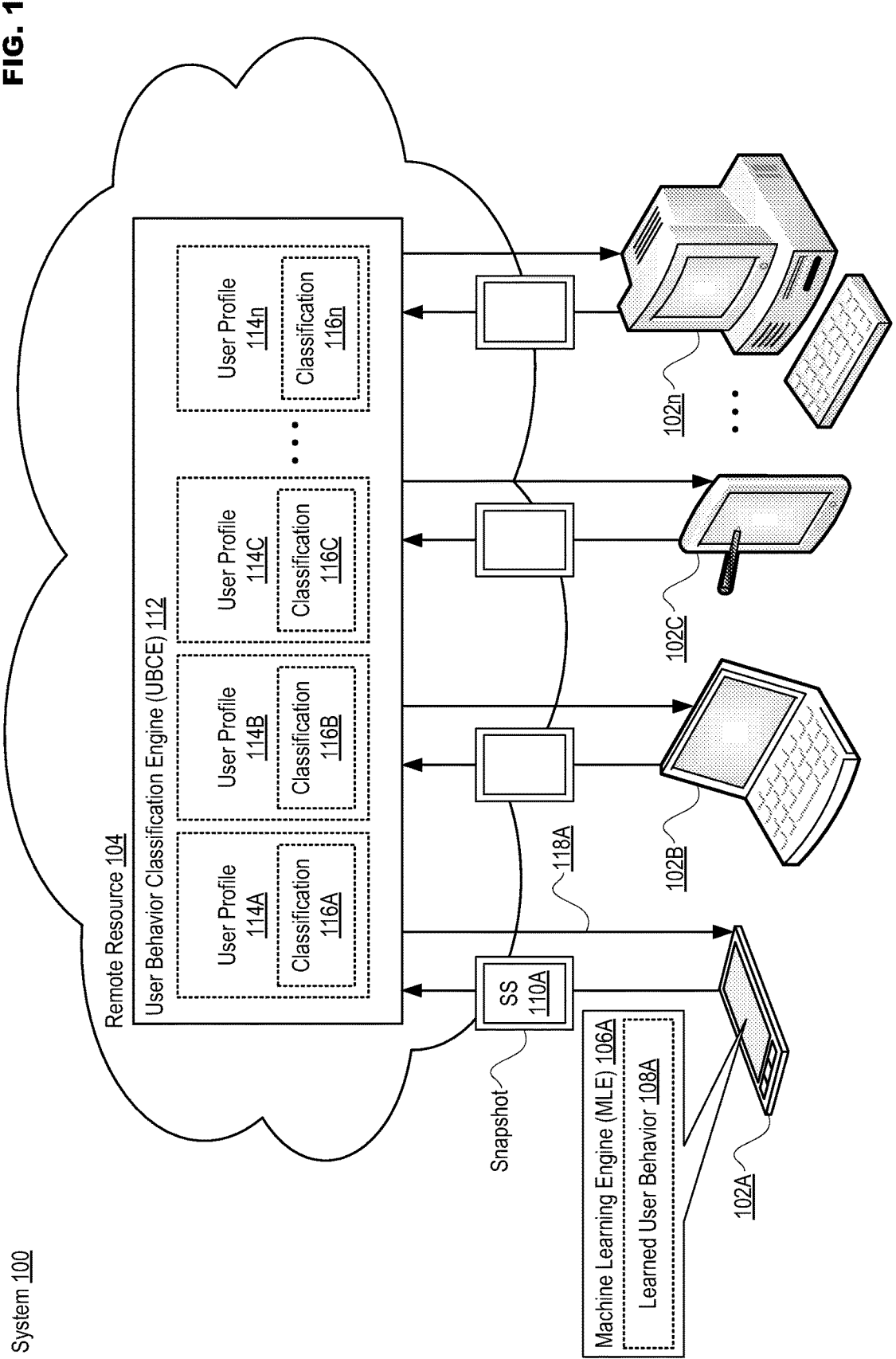
FIG. 1 illustrates an example protection system including machine learning snapshot evaluation in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a protection system including machine learning snapshot evaluation. In one embodiment, a device may comprise a machine learning engine (MLE) to generate snapshots of device operation. The MLE may utilize active or planned operations in the snapshot to learn user behavior. Once normal user behavior is established for the device, the MLE may be able to determine when snapshots include unusual behavior that may signify a threat to the device. Snapshots that are determined to include unusual behavior by the MLE may be transmitted to a remote resource for evaluation. The remote resource may comprise, for example, at least a user behavior classification engine (UBCE) that may classify the user behavior by characterizing it as at least one type of use. The snapshot may be analyzed by the UBCE to determine if potential threats exist in the device, and the threat analysis may be provided to the device for evaluation and/or corrective action. In one embodiment, the MLE may also provide a snapshot and user data to the remote resource if the device is new to the system. The remote resource may create a user account (if necessary), associate the device with the user account and analyze the device to determine if it is "clean" (e.g., has no threats).

In one embodiment, a device configured for machine learning snapshot evaluation may comprise, for example, a communication module, a memory module and an MLE. The communication module may be to interact with at least a remote resource. The memory module may be to store at least learned user behavior. The MLE may be to generate a snapshot of device operation, determine if unusual user behavior has occurred based on an evaluation of the snapshot in view of the learned user behavior, cause the communication module to transmit the snapshot and user data to the remote resource if it is determined that unusual user behavior has occurred, receive threat analysis from the remote resource via the communication module, the threat analysis being received in response to the transmission of the snapshot and determine if a potential threat exists to the device based at least on the threat analysis.

In one embodiment, the MLE may further be to determine if the device is new and transmit at least the snapshot and the user data to the remote resource if it is determined that the device is new. The MLE may further be to determine if corrective action is needed in the device based on the results of a verification received from the remote resource via the communication module. The MLE being to generate a snapshot of device operations may comprise the machine learning engine being to identify at least one operation in the device based on at least one of active operations in the device at the time the snapshot was generated or planned operations in the device at the time the snapshot was generated. The MLE may further be to verify signatures of software modules associated with the at least one active or planned operation identified in the snapshot. The MLE may further be to learn user behavior based on comparing the at least one active or planned operation identified in the snapshot to at least one active or planned operation identified in at least one previous snapshot stored in the memory module. The MLE being to determine if unusual user behavior has occurred may comprise the MLE being to determine if the at least one active or planned operation is unexpected based on the learned user behavior.

In the same or a different embodiment, a device configured to operate as a remote resource may comprise, for example, a communication module and a UBCE. The communication module may be to interact with at least a user device. The UBCE may be to receive at least a snapshot of user device operation and user data from the user device, determine if a new user account is needed based at least on the user data, establish a new user account if it is determined that a new user account is needed, associate the user device with an existing user account or the new user account, verify if the user device is new based at least on the snapshot and provide results of the verification to the user device.

The UBCE may further be to develop a user classification based at least on the snapshot. The UBCE being to develop a user classification may comprise the UBCE being to characterize at least one type of use for the device based at least on the snapshot. A method for machine learning snapshot evaluation consistent with the present disclosure may comprise, for example, generating a snapshot of operation in a device, determining if unusual user behavior has occurred based on an evaluation of the snapshot in view of learned user behavior stored in the device, causing the snapshot and user data to be transmitted to a remote resource if it is determined that unusual user behavior has occurred, receiving threat analysis from the remote resource in response to the transmission of the snapshot and determining if a potential threat exists to the device based at least on the threat analysis. Another method for machine learning snapshot evaluation consistent with the present disclosure may comprise, for example, receiving in a remote resource at least a snapshot of user device operation and user data from a user device, determining if a new user account is needed based at least on the user data, establishing a new user account if it is determined that a new user account is needed, associating the user device with an existing user account or the new user account, verifying if the user device is new based at least on the snapshot and providing results of the verification to the user device.

FIG. 1 illustrates an example protection system including machine learning snapshot evaluation in accordance with at least one embodiment of the present disclosure. System 100 may comprise at least one device 102 (e.g., device 102A, device 102B, device 102C . . . device 102n or collectively "devices 102A . . . n") and remote resource 104. In the example disclosed in FIG. 1, four (4) devices 102A . . . n have been disclosed merely for the sake of explanation. In practice, the number of devices may vary depending on the implementation. Examples of devices 102A . . . n may comprise, but are not limited to, a mobile communication device such as a cellular handset or a smartphone based on the Android® OS, iOS®, Windows® OS, Mac OS, Tizen OS, Firefox OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Remote resource 104 may comprise at least one computing device that is accessible to devices 102A . . . n via a local area-network (LAN), a wide-area network (WAN) such as the Internet, etc. In one embodiment, remote resource 104 may comprise one or more servers organized in a cloud-computing configuration.

The example of FIG. 1 further comprises various features illustrated for device 102A that may also be applicable to devices 102B . . . n, but were omitted for the sake of clarity. In one embodiment, device 102A may comprise at least MLE 106A. MLE 106A may include equipment and/or software configured to learn user behavior 108A by generating a snapshot (SS) 110A of device operation. Learned user behavior 108A may comprise, for example, operations that commonly occur in device 102A as the result of normal use by at least one user of device 102A. SS 110A may be generated periodically by MLE 106A, at times set in MLE 106A by a user of device 102A, manually at the request of the user, on occurrence of events in device 102A, etc. SS 110A may comprise, for example, identification of equipment and/or software that was active in device 102 at the time SS 110A was generated, or that was planned to operate in device 102 at the time SS 110A was generated. Examples of various active operations that may be identified within SS 110A may comprise at least one of running applications, network activity, registry activity, file system activity, process and thread activity or profiling activity. SS 110A may also identify various planned operations derived from, for example, at least one of registry settings corresponding to run, run once, startup, installed components, registry settings corresponding to explorer such as protocols, ShellEx, etc., registry settings corresponding to Internet Explorer, tasks in the OS scheduler, services, drivers, codecs, boot.exe, image hijacks, Appinit, known dlls, WinLogon, Winsock providers, printer monitors, local security authority (LSA) providers, network providers, etc. In one embodiment, SS 110A may further comprise the date and time when SS 110A was captured, as well as details about device 102A such as, for example, the manufacturer, model, configuration identifier, serial number, build date, OS, active network connections, etc.

In one embodiment, MLE 106A may store at least the previously generated SS 110A in device 102A. MLE 106A may then be able to compare a recently captured SS 110A to at least the previously generated SS 110A to learn user behavior 108A. User behavior 108A may be learned using, for example, a machine learning algorithm that tracks operations that occur, or are planned to occur, repeatedly from one SS 110A to another. The appearance of the same operations in multiple SS 110A may indicate that the occurrence of the operation may be associated with normal operation in device 102A. Learning in this manner, MLE 106A may begin to formulate operational patterns that make up user behavior 108A.

After MLE 106A has learned user behavior 108A (e.g., after evaluating a series of SS 110A captured over a time period in which device 102A is being used), MLE 106A may then start to evaluate subsequent SS 110A for unusual behavior (e.g., as an indicator of a possible threat in device 102A). For example, the absence of common operations, or the occurrence of new operations, may indicate that something is amiss in device 102A. MLE 106A may detect, for example, that a resource not commonly accessed by a user is being accessed in a current SS 110A, an operation that commonly appears in snapshots is no longer running (or may have been replaced by another similar operation), that new software has been loaded onto device 102A that does not correspond to other software commonly accessed by the user, etc. In one embodiment, MLE 106A may also leverage predictive analysis techniques such as, for example, Bayesian networks to identify the likelihood of moving from one SS 110A to another. This knowledge may enable faster identification of suspicious outliers as well as to identify when there are signs that malware may be interfering with snapshot generation in device 102A and, for example, making SS 110A look benign when the system has already been compromised. Rolling back to a previous snapshot, as disclosed above, is but one example where expert heuristics may be leveraged. In the same or a different embodiment, uses may have the option of storing SS 110A in a secure location (e.g., a private cloud) and then only sharing data useful for predictive analysis with the global cloud to increase their personal privacy. This would provide the benefit of shared learning while maintaining the privacy of the user.

After MLE 106A determines that SS 110A may comprise unusual behavior, MLE 106A may cause SS 110A to be transmitted to remote resource 104. Remote resource 104 may comprise UBCE 112 to classify user behavior 108A and, based on this classification, diagnose anomalies that may constitute threats to device 102A. In one embodiment, UBCE 112 may classify user behavior 108A based on a type of use for device 102A. Example types of use may include, but are not limited to, as a gaming system (e.g., for playing games), e.g., a business system (e.g., for word processing, spreadsheets, etc.), an educational system (e.g., for executing teaching programs), a design system (e.g., for computer aided drawing (CAD) or computer aided manufacturing (CAM)), a web browsing system, etc. These types may include further characteristics such as an age (e.g., an educational system for a young child), a category of risk (e.g., a web browser system that typically visits risky or suspicious web sites), etc. A classification may include more than one type, and the classified types may be continuously updated based on new information (e.g., information received via SS 110A).

Classification may initiate upon registration of a user in UBCE 112. Registration in UBCE 112 may occur by, for example, a user manually registering (e.g., via a webpage), a device (e.g., device 102a) automatically registering the user or prompting the user to register, etc. Registration may include a notification to the user about the sharing of personal and/or device data so that the user may make an informed decision about participation in system 100. User registration may result in user profile 114A including at least user identification information. User profile 114A may also comprise other information such as user residence information, user business information, user billing information (e.g., if remote resource 104 is associated with a pay service), etc. Device 102A, as well as any other device of the user enrolled in system 100, may be associated with user profile 114A, and classification 116A may start to generate for device 102A based on the information in user profile 114A and/or SS 110A received from MLE 106A in device 102A. In one embodiment, "new" devices may go through an initial verification to ensure that the device is clean (e.g., is free from threats and ready for user behavior learning to initiate). A new device may be, for example, a brand new device obtained directly from a manufacturer, from a retailer, etc., an unused device, or simply a device that is newly associated with user profile 114A. An initial verification may be important because a user may believe that device 102A is clean (e.g., new and unaltered from the manufacturer or at least free of malware), but in actuality, hardware and/or software may have been added/removed/altered, malware may have found its way onto the device, etc. In an example of operation, a new device 102A may transmit a first SS 110A to UBCE 112 for verification. UBCE 112 may receive data from a variety of devices (e.g., devices 102B . . . n) and from this data may be able to formulate a baseline operational configuration to which SS 110A may be compared to verify that device 102A is clean. For example, UBCE 112 may determine the manufacturer, model, configuration, build date, OS, etc. of device 102A from user profile 114A and/or SS 110A, may use this data to determine a clean configuration for device 102A based on data received from other devices (e.g., SS 110B . . . n) and may then compare SS 110A to the clean configuration to determine if discrepancies exist in SS 110A. UBCE 112 may then provide results from the verification to device 102A pointing out any discrepancies in the configuration. The user of device 102A may then be assured that their device is starting out clean before learning user behavior 108A. Moreover, the initial SS 110A may provide a baseline configuration for device 102A for use by UBCE 112 when generating classification 116A.

After classification 116A has been established, device 102A (e.g., MLE 106A) may transmit SS 110A (e.g., along with information identifying the user if not already contained in SS 110A) to remote resource 104 whenever unusual behavior is detected. UBCE 112 may then compare SS 110A to classification 116A to determine if the behavior is in accordance with a device having classification 116A. For example, UBCE 112 may generate a "model configuration" (e.g., an exemplary SS 110) based on data received from other devices (e.g., devices 102B . . . n) in the same or similar classification 116A as device 102A. In generating the exemplary SS 110, other factors may also be considered such as the type of device 102A, the make/model/build year of device 102A, etc. UBCE 112 may then proceed to compare the contents of the exemplary SS 110 to SS 110A to determine if any of the operations identified in SS 110A are suspicious. If the behavior in SS 110A is deemed questionable, then UBCE 112 may transmit a threat analysis 118A to device 102A identifying threats that may exist in device 102A. In one embodiment, MLE 106A may evaluate threat analysis 118A received from UBCE 112 to determine if potential threats exist in the device. If a threat is believed to exist, MLE 106A may trigger corrective action such as, but not limited to, notifying the user of potential threats, quarantining files including potential threats, deleting files including potential threats, disabling network access and/or other actions to neutralize the threat.

Figure 2:
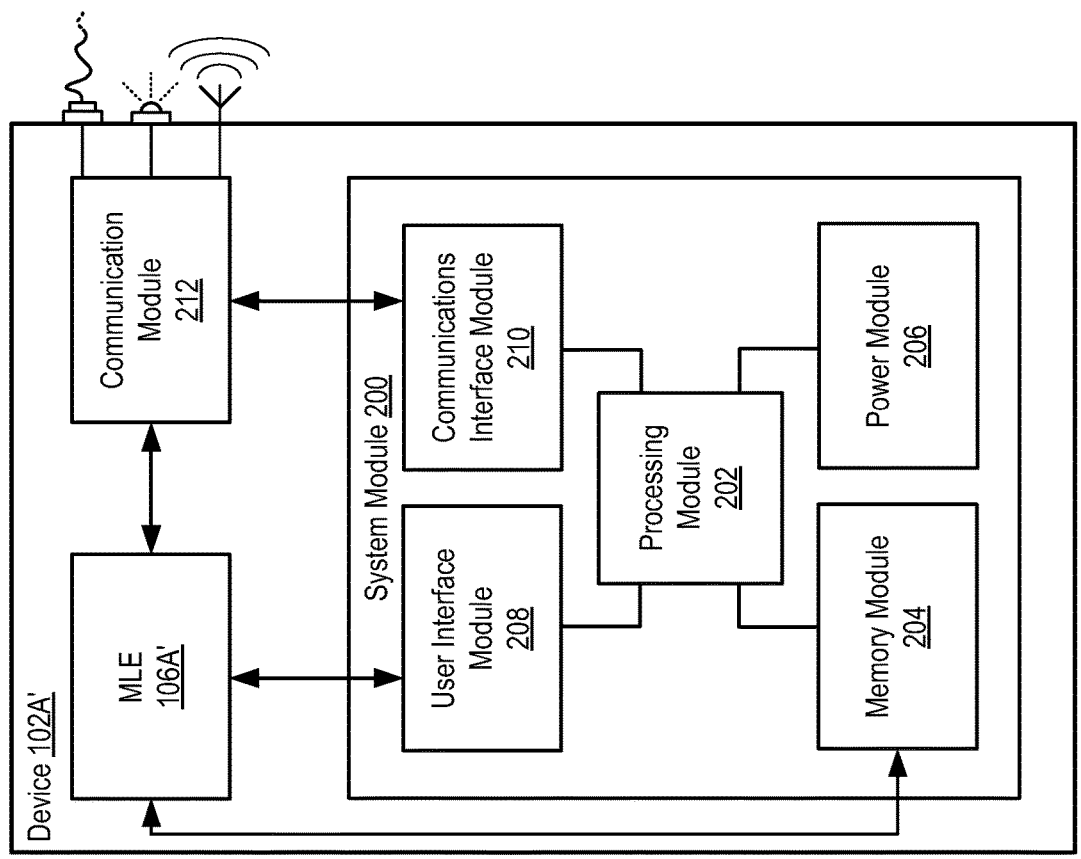
FIG. 2 illustrates an example configuration for a device in accordance with at least one embodiment of the present disclosure.

FIG. 2 illustrates an example configuration for device 102A' in accordance with at least one embodiment of the present disclosure. In particular, device 102A' may be capable of performing example functionality such as disclosed in FIG. 1. However, device 102A' is meant only as an example of equipment usable in embodiments consistent with the present disclosure, and is not meant to limit these various embodiments to any particular manner of implementation. The example configuration of device 102A' disclosed in FIG. 2 may also be applicable to devices 102B . . . n also disclosed in FIG. 1.

Device 102A' may comprise, for example, system module 200 configured to manage device operations. System module 200 may include, for example, processing module 202, memory module 204, power module 206, user interface module 208 and communication interface module 210. Device 102A' may further include communication module 212 and MLE 106A'. While communication module 212 and MLE 106A' have been shown as separate from system module 200, the example implementation shown in FIG. 2 has been provided merely for the sake of explanation. Some or all of the functionality associated with communication module 212 and/or MLE 106A' may be incorporated in system module 200.

In device 102A', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102A'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102A'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of device 102A' such as, for example, static RAM (SRAM) or Dynamic RAM (DRAM). ROM may include non-volatile (NV) memory modules configured based on BIOS, UEFI, etc. to provide instructions when device 102A' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply device 102A' with the power needed to operate. User interface module 208 may include equipment and/or software to allow users to interact with device 102A' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 208 may be incorporated within device 102A' and/or may be coupled to device 102A' via a wired or wireless communication medium.

Communication interface module 210 may be configured to manage packet routing and other control functions for communication module 212, which may include resources configured to support wired and/or wireless communications. In some instances, device 102A' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

In the example disclosed in FIG. 2, MLE 106A' may be configured to interact with at least memory module 206, communication module 212 and/or user interface module 208. In an example of operation, MLE 106A' may generate SS 110A and may compare SS 110A to a previous SS 110A stored in memory module 204 to learn user behavior 108A. After user behavior 108A is learned, if unusual behavior is determined to exist in SS 110A, then MLE 106A' may cause communication module 212 to transmit SS 110A to UBCE 112. Later, ME 106A' may receive threat analysis 118A via communication module 212. MLE 106A' may then evaluate threat analysis 118A to determine if any potential threats exist in device 102A'. If any threats are determined to exist, MLE 106A' may cause a notification informing a user of the potential threats to be presented to a user of device 102A' via user interface module 208 and/or may cause corrective actions to be performed in device 102A'.

Figure 3:
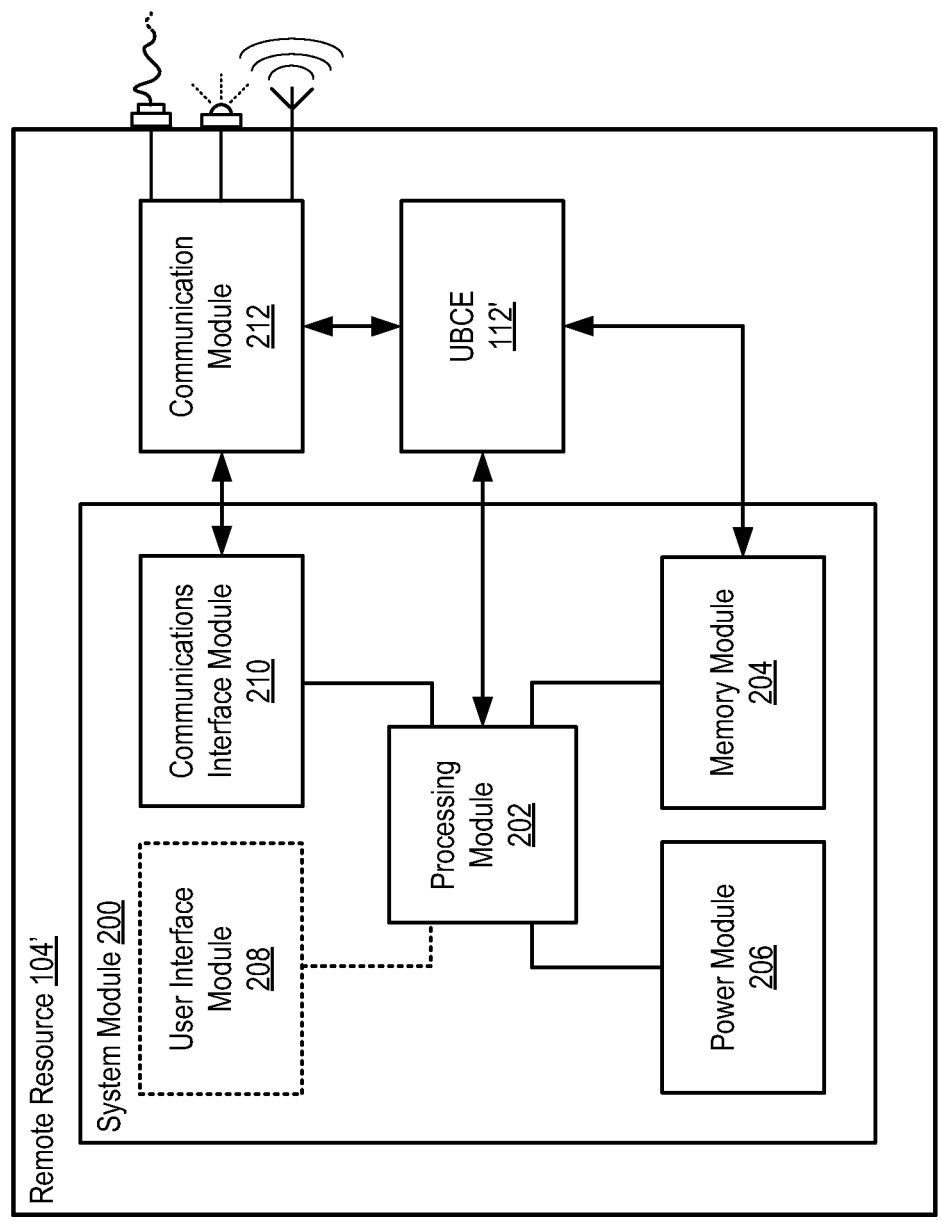
FIG. 3 illustrates an example configuration for a remote resource in accordance with at least one embodiment of the present disclosure.

FIG. 3 illustrates an example configuration for remote resource 104' in accordance with at least one embodiment of the present disclosure. Modules and/or other elements that are the same as, or substantially similar to, those shown in reference to example device 102A' presented in FIG. 2 have been identified using the same drawing reference number in FIG. 3.

Remote resource 104' may be a standalone computing device, or one of a plurality of computing devices operating individually or in unison, to perform various activities such as disclosed in the example of FIG. 1. In remote resource 104', user interface module 208 has been illustrated as optional in that some devices (e.g., servers) may not include user interface module 208 but may rely upon other equipment (e.g., a remote terminal) to facilitate user interaction with remote resource 104'. In one embodiment, UBCE 112' may interact with at least processing module 202, memory module 204 and communication module 212. In an example of operation, UBCE 112' may receive SS 110A from ME 106A in device 102A via communication module 212. UBCE 112' may then rely upon processing module 202 and/or memory module 204 to locate user profile 114A corresponding to the user of device 102A, to access classification 116A and to generate a model configuration (e.g., an exemplary SS 110) based on classification 116A. Moreover, processing module 202 and/or memory module 204 may assist in determining if any threats exist in device 102A' based on comparing SS 110A to the exemplary SS 110. UBCE 112' may then cause communication module 212 to transmit at least threat analysis 118A resulting from the analysis of SS 110A to device 102A.

Figure 4:
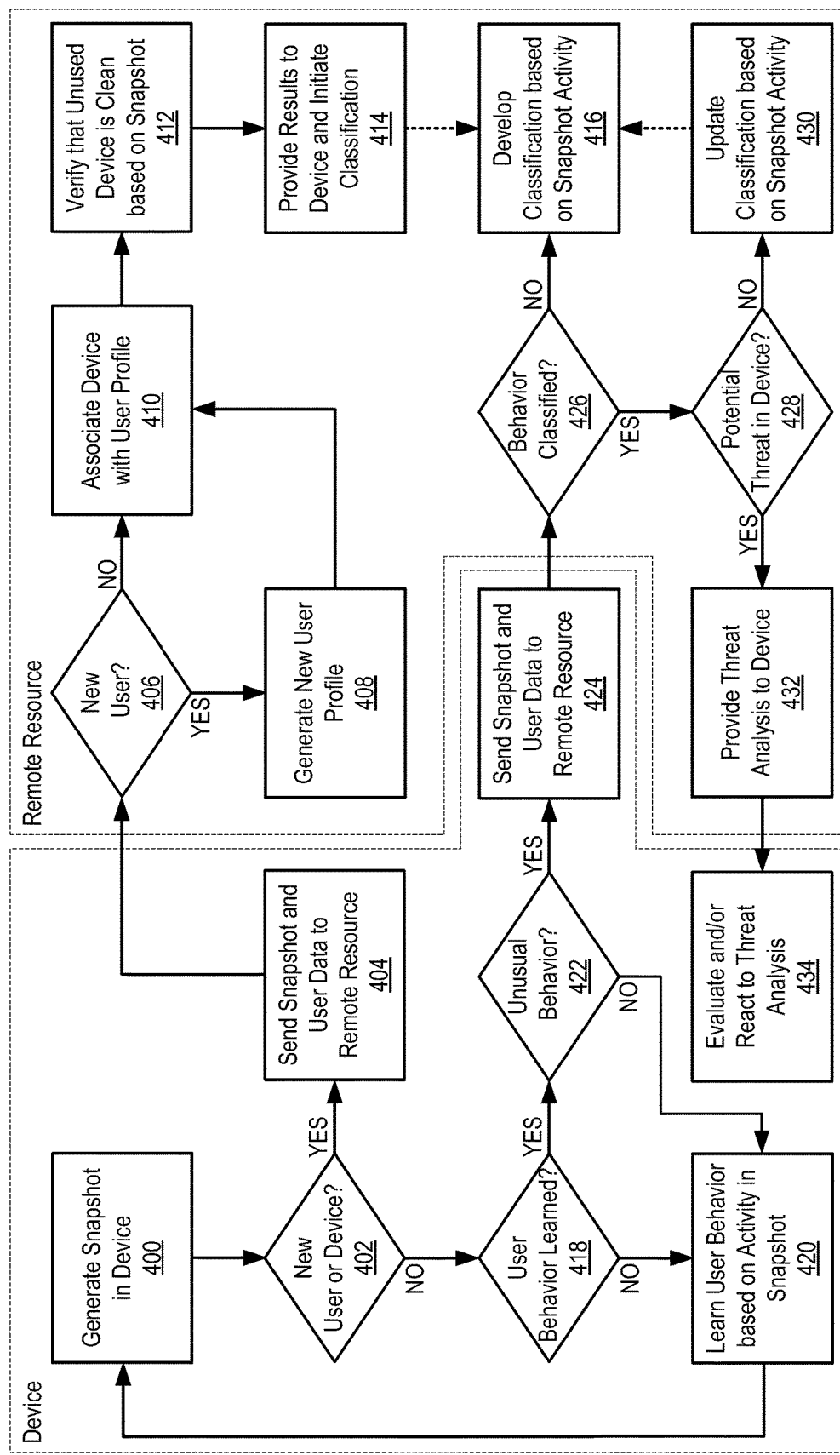
FIG. 4 illustrates example operations for a protection system including machine learning snapshot evaluation in accordance with at least one embodiment of the present disclosure.

FIG. 4 illustrates example operations for a protection system including machine learning snapshot evaluation in accordance with at least one embodiment of the present disclosure. In operation 400, a snapshot may be generated of device operation (e.g., by an MLE in the device). The snapshot may be triggered automatically (e.g., periodically, on the occurrence of an event) or manually by a user of the device. A determination may then be made in operation 402 as to whether the user and/or device are new to the system (e.g., have not yet been registered in the remote resource). If in operation 402 it is determined that the device is new, then in operation 404 a snapshot and user data (e.g., data at least identifying the user) may be transmitted to the remote resource. A determination may then be made in operation 406 as to whether the user is new user (e.g., not yet registered with the remote resource). If in operation 406 it is determined that the user has not yet registered with the remote resource, then in operation 408 a new user profile may be created for the user. Following a determination that the user profile already exists in operation 406, or following creation of the user profile in operation 408, the device may then be associated with the user profile in operation 410. A verification may then be performed in operation 412 to determine if the device is clean (e.g., that the snapshot of the device contains operations that would be expected for a new device of this type, make, model, build date, with a certain OS, etc. The results of the verification may then be provided to the device so that the user and/or MLE can make any changes necessary to neutralize any detected threats, vulnerabilities or deficiencies. Classification may then be initiated, which is indicated by the dotted arrow to operation 416 wherein a UBCE in the remote resource may begin to classify at least one type of use for the device by the user (e.g., gaming device, web browsing, business/educational/design use, etc.).

If in operation 402 it is determined that neither the user nor the device are new, then in operation 418 a further determination may be made as to whether user behavior has been learned for the device. For example, a series of snapshots may be needed to arrive at a point wherein user behavior is learned for a new device. If in operation 418 it is determined that user behavior has not been learned, then in operation 420 the MLE may continue to learn user behavior based on the activity in the snapshot. Operation 420 may be followed by a return to operation 400 to generate an additional snapshot. If in operation 418 it is determined that user behavior has been learned, then in operation 422 a further determination may be made as to whether the snapshot contains any unusual behavior (e.g., operations that are not consistent with the learned user behavior). A determination in operation 422 that the snapshot does not contain any unusual behavior may be followed by operation 420 wherein activity contained in the snapshot may be used to continually refine the user behavior learned by the MLE. If it is determined in operation 422 that the snapshot contains unusual behavior, then in operation 424 the snapshot may be transmitted to the remote resource (e.g., including user data).

Upon receiving the snapshot in the remote resource, a determination may then be made in operation 426 as to whether at least one type of use for the device has been classified based on the user behavior. If in operation 426 it is determined that the user behavior has not yet been classified, then in operation 416 development of a classification may continue until complete (e.g., more snapshots may be required to complete the classification). On the other hand, if in operation 426 it is determined that the classification is complete, then in operation 428 a further determination may be made as to whether the device comprises potential threats based on evaluating the snapshot in view of the classification (e.g., based on an exemplary snapshot corresponding to at least one type of use in the classification). If in operation 428 it is determined that no potential threats to the device exist in the snapshot, then activity in the snapshot may be utilized to update the classification in operation 430. If in operation 428 it is determined that at least one potential threat exists in the device based on the snapshot, then in operation 432 threat analysis may be transmitted to the device, the threat analysis describing, for example, any potential threats to the device that were determined in operation 428. The device may receive the threat analysis and in operation 434 may evaluate and/or react to the threat analysis, if needed (e.g., may perform preventative measures, corrective actions, etc.).

While FIG. 4 may illustrate operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory machine readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a protection system including machine learning snapshot evaluation. A device may comprise a machine learning engine (MLE) to generate snapshots of device operation. The MLE may use active or planned operations in the snapshot to learn user behavior. Once normal user behavior is established for the device, the MLE may be able to determine when snapshots include unusual behavior that may signify a threat to the device. Snapshots determined to include unusual behavior may be transmitted to a remote resource for evaluation. The remote resource may include at least a user behavior classification engine (UBCE) to classify the user behavior by characterizing it as at least one type of use. The snapshot may be analyzed by the UBCE to determine if potential threats exist in the device, and the threat analysis may be provided to the device for evaluation and/or corrective action.

The following examples pertain to further embodiments. The following examples of the present disclosure may comprise subject material such as a device, a method, at least one machine readable medium for storing instructions that when executed cause a machine to perform acts based on the method, means for performing acts based on the method and/or a protection system including machine learning snapshot evaluation, as provided below.

According to example 1 there is provided a device for machine learning snapshot evaluation. The device may comprise a communication module to interact with at least a remote resource, a memory module to store at least learned user behavior and a machine learning engine to generate a snapshot of device operation, determine if unusual user behavior has occurred based on an evaluation of the snapshot in view of the learned user behavior, cause the communication module to transmit the snapshot and user data to the remote resource if it is determined that unusual user behavior has occurred, receive threat analysis from the remote resource via the communication module, the threat analysis being received in response to the transmission of the snapshot and determine if a potential threat exists to the device based at least on the threat analysis.

Example 2 may include the elements of example 1, wherein the machine learning engine is further to determine if the device is new and transmit at least the snapshot and the user data to the remote resource if it is determined that the device is new.

Example 3 may include the elements of any of examples 1 to 2, wherein the machine learning engine is further to determine if corrective action is needed in the device based on the results of a verification received from the remote resource via the communication module.

Example 4 may include the elements of any of examples 1 to 2, wherein the machine learning engine being to generate a snapshot of device operations comprises the machine learning engine being to identify at least one operation in the device based on at least one of active operations in the device at the time the snapshot was generated or planned operations in the device at the time the snapshot was generated.

Example 5 may include the elements of example 4, wherein the active operations comprise at least one of running applications, network activity, registry activity, file system activity, process and thread activity or profiling activity.

Example 6 may include the elements of example 4, wherein scheduled operations are derived from at least one of registry settings corresponding to run, run once, startup, installed components, registry settings corresponding to explorer including protocols or ShellEx, registry settings corresponding to Internet Explorer, tasks in the OS scheduler, services, drivers, codecs, boot.exe, image hijacks, Appinit, known dlls, WinLogon, Winsock providers, printer monitors, local security authority (LSA) providers or network providers.

Example 7 may include the elements of example 4, wherein the machine learning engine is further to verify signatures of software modules associated with the at least one active or planned operation identified in the snapshot.

Example 8 may include the elements of example 4, wherein the machine learning engine is further to learn user behavior based on comparing the at least one active or planned operation identified in the snapshot to at least one active or planned operation identified in at least one previous snapshot stored in the memory module.

Example 9 may include the elements of example 4, wherein the machine learning engine being to determine if unusual user behavior has occurred comprises the machine learning engine being to determine if the at least one active or planned operation is unexpected based on the learned user behavior.

According to example 10 there is provided at least one device configured to operate as a remote resource. The at least one device may comprise a communication module to interact with at least a user device and a user behavior classification engine to receive at least a snapshot of user device operation and user data from the user device, determine if a new user account is needed based at least on the user data, establish a new user account if it is determined that a new user account is needed, associate the user device with an existing user account or the new user account, verify if the user device is new based at least on the snapshot and provide results of the verification to the user device.

Example 11 may include the elements of example 10, wherein the user behavior classification engine is further to cause a user of the device to be prompted to provide information for setting up a new user account if it is determined that a new user account is needed.

Example 12 may include the elements of any of examples 10 to 11, wherein the user behavior classification engine is further to develop a user classification based at least on the snapshot.

Example 13 may include the elements of example 12, wherein the user behavior classification engine being to develop a user classification comprises the user behavior classification engine being to characterize at least one type of use for the device based at least on the snapshot.

According to example 14 there is provided a method for machine learning snapshot evaluation. The method may comprise generating a snapshot of operation in a device, determining if unusual user behavior has occurred based on an evaluation of the snapshot in view of learned user behavior stored in the device, causing the snapshot and user data to be transmitted to a remote resource if it is determined that unusual user behavior has occurred, receiving threat analysis from the remote resource in response to the transmission of the snapshot and determining if a potential threat exists to the device based at least on the threat analysis.

Example 15 may include the elements of example 14, and may further comprise determining if the device is new and transmitting at least the snapshot and the user data to the remote resource if it is determined that the device is new.

Example 16 may include the elements of any of examples 14 to 15, and may further comprise determining if corrective action is needed in the device based on the results of a verification received from the remote resource.

Example 17 may include the elements of any of examples 14 to 15, wherein generating a snapshot of device operations comprises identifying at least one operation in the device based on at least one of active operations in the device at the time the snapshot was generated or planned operations in the device at the time the snapshot was generated.

Example 18 may include the elements of example 17, wherein the active operations comprise at least one of running applications, network activity, registry activity, file system activity, process and thread activity or profiling activity.

Example 19 may include the elements of example 17, wherein scheduled operations are derived from at least one of registry settings corresponding to run, run once, startup, installed components, registry settings corresponding to explorer including protocols or ShellEx, registry settings corresponding to Internet Explorer, tasks in the OS scheduler, services, drivers, codecs, boot.exe, image hijacks, Appinit, known dlls, WinLogon, Winsock providers, printer monitors, local security authority (LSA) providers or network providers.

Example 20 may include the elements of example 17, any may further comprise verifying signatures of software modules associated with the at least one active or planned operation identified in the snapshot.

Example 21 may include the elements of example 17, any may further comprise learning user behavior based on comparing the at least one active or planned operation identified in the snapshot to at least one active or planned operation identified in at least one previous snapshot stored in the device.

Example 22 may include the elements of example 17, wherein determining if unusual user behavior has occurred comprises determining if the at least one active or planned operation is unexpected based on the learned user behavior.

According to example 23 there is provided a method for machine learning snapshot evaluation. The method may comprise receiving in a remote resource at least a snapshot of user device operation and user data from a user device, determining if a new user account is needed based at least on the user data, establishing a new user account if it is determined that a new user account is needed, associating the user device with an existing user account or the new user account, verifying if the user device is new based at least on the snapshot and providing results of the verification to the user device.

Example 24 may include the elements of example 23, any may further comprise causing a user of the user device to be prompted to provide information for setting up a new user account if it is determined that a new user account is needed.

Example 25 may include the elements of any of examples 23 to 24, and may further comprise developing a user classification based at least on the snapshot using a user behavior classification engine.

Example 26 may include the elements of example 25, wherein developing a user classification comprises characterizing at least one type of use for the device based at least on the snapshot.

According to example 27 there is provided a system including at least a device and a remote resource, the system being arranged to perform the method of any of the above examples 14 to 26.

According to example 28 there is provided a chipset arranged to perform the method of any of the above examples 14 to 26.

According to example 29 there is provided at least one machine readable medium comprising a plurality of instructions that, in response to be being executed on a computing device, cause the computing device to carry out the method according to any of the above examples 14 to 26.

According to example 30 there is provided at least one device for use with a protection system including machine learning snapshot evaluation, the at least one device being arranged to perform the method of any of the above examples 14 to 26.

According to example 31 there is provided a system for machine learning snapshot evaluation. The system may comprise means for generating a snapshot of operation in a device, means for determining if unusual user behavior has occurred based on an evaluation of the snapshot in view of learned user behavior stored in the device, means for causing the snapshot and user data to be transmitted to a remote resource if it is determined that unusual user behavior has occurred, means for receiving threat analysis from the remote resource in response to the transmission of the snapshot and means for determining if a potential threat exists to the device based at least on the threat analysis.

Example 32 may include the elements of example 31, any may further comprise means for determining if the device is new and means for transmitting at least the snapshot and the user data to the remote resource if it is determined that the device is new.

Example 33 may include the elements of any of examples 31 to 32, and may further comprise means for determining if corrective action is needed in the device based on the results of a verification received from the remote resource.

Example 34 may include the elements of any of examples 31 to 32, wherein the means for generating a snapshot of device operations comprise means for identifying at least one operation in the device based on at least one of active operations in the device at the time the snapshot was generated or planned operations in the device at the time the snapshot was generated.

Example 35 may include the elements of example 34, and may further comprise means for verifying signatures of software modules associated with the at least one active or planned operation identified in the snapshot.

Example 36 may include the elements of example 34, and may further comprise means for learning user behavior based on comparing the at least one active or planned operation identified in the snapshot to at least one active or planned operation identified in at least one previous snapshot stored in the device.

Example 37 may include the elements of example 34, wherein the means for determining if unusual user behavior has occurred comprises means for determining if the at least one active or planned operation is unexpected based on the learned user behavior.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device configured for machine learning snapshot evaluation, comprising:
    communication circuitry to interact with at least a remote resource;
    memory circuitry to store at least learned user behavior; and
    a machine learning engine to:
        receive user data associated with the user of the device;
        generate a snapshot operation of the device, said snapshot to identify at least one active operation in the device and at least one planned operation in the device at the time the snapshot is generated;
        determine if unusual user behavior has occurred based on a comparison of the snapshot and the learned user behavior, wherein unusual behavior includes an absence of a common active or planned operation or a presence of a new active or planned operation;
        cause the communication circuitry to transmit the snapshot and the user data to the remote resource responsive to a determination that an unusual user behavior has occurred;
        determine if the device is new; and transmit at least the snapshot and the user data to the remote resource if it is determined that the device is new;
        receive threat analysis from the remote resource via the communication circuitry, the threat analysis being received in response to the transmission of the snapshot;
        determine if a potential threat exists to the device based at least on the threat analysis.

2. The device of claim 1, wherein the machine learning engine is further to determine if corrective action is needed in the device based on the results of a verification received from the remote resource via the communication circuitry.

3. The device of claim 1, wherein the machine learning engine is further to verify signatures of software circuitry associated with the at least one planned operation identified in the snapshot.

4. The device of claim 1, wherein the machine learning engine is further to learn user behavior based on comparing the at least one active or planned operation identified in the snapshot to at least one planned operation identified in at least one previous snapshot stored in the memory circuitry.

5. The device of claim 1, wherein the machine learning engine being to determine if unusual user behavior has occurred comprises the machine learning engine being to determine if the at least one planned operation is unexpected based on the learned user behavior.

6. A method for machine learning snapshot evaluation, comprising:
    receiving user data associated with a user of a device;
    generating a snapshot of at least one planned operation and at least one active operation in the device;
    determining if unusual user behavior has occurred based on a comparison of the snapshot and learned user behavior stored in the device, wherein unusual behavior includes an absence of a common active or planned operation or a presence of a new active or planned operation;
    causing the snapshot and the user data to be transmitted to a remote resource responsive to a determination that unusual user behavior has occurred;
    determining if the device is new; and transmitting at least the snapshot and the user data to the remote resource if it is determined that the device is new;
    receiving threat analysis from the remote resource in response to the transmission of the snapshot;
    determining if a potential threat exists to the device based at least on the threat analysis.

7. The method of claim 6, further comprising:
    determining if corrective action is needed in the device based on the results of a verification received from the remote resource.

8. The method of claim 6, further comprising:
    verifying signatures of software circuitry associated with the at least one active or planned operation identified in the snapshot.

9. The method of claim 6, further comprising:
    learning user behavior based on comparing the at least one active or planned operation identified in the snapshot to at least one active or planned operation identified in at least one previous snapshot stored in the device.

10. The method of claim 6, wherein determining if unusual user behavior has occurred comprises determining if the at least one active or planned operation is unexpected based on the learned user behavior.

11. At least one non-transitory machine readable storage medium having stored thereon, individually or in combination, instructions that when executed by one or more processors result in the following operations for machine learning snapshot evaluation, comprising:
    receiving, via a user interface, user data associated with a user of a device;
    generating a snapshot of at least one planned operation and at least one active operation in the device;
    determining if unusual user behavior has occurred based on a comparison of the snapshot and learned user behavior stored in the device, wherein unusual behavior includes an absence of a common active or planned operation or a presence of a new active or planned operation;
    causing the snapshot and the user data to be transmitted to a remote resource responsive to a determination that unusual user behavior has occurred;
    determining if the device is new; and transmitting at least the snapshot and the user data to the remote resource if it is determined that the device is new;
    receiving threat analysis from the remote resource in response to the transmission of the snapshot;
    determining if a potential threat exists to the device based at least on the threat analysis.

12. The non-transitory machine readable storage medium of claim 11, further comprising instructions that when executed by one or more processors result in the following operations, comprising:
   determining if corrective action is needed in the device based on the results of a verification received from the remote resource.

13. The non-transitory machine readable storage medium of claim 11, further comprising instructions that when executed by one or more processors result in the following operations, comprising:
   verifying signatures of software circuitry associated with the at least one active or planned operation identified in the snapshot.

14. The non-transitory machine readable storage medium of claim 11, further comprising instructions that when executed by one or more processors result in the following operations, comprising:
   learning user behavior based on comparing the at least one active or planned operation identified in the snapshot to at least one active or planned operation identified in at least one previous snapshot stored in the device.

15. The non-transitory machine readable storage medium of claim 11, wherein determining if unusual user behavior has occurred comprises determining if the at least one active or planned operation is unexpected based on the learned user behavior.

* * * * *